(12) United States Patent  
Lee

(10) Patent No.: US 7,602,769 B2
(45) Date of Patent: Oct. 13, 2009

(54) AUDIO PACKET SWITCHING SYSTEM

(75) Inventor: Seok Won Lee, Seoul (KR)

(73) Assignee: LG Nortel Co., Ltd., Seoul (KR)

( * ) Notice: Subject to any disclaimer, the term of this patent is extended or adjusted under 35 U.S.C. 154(b) by 1543 days.

(21) Appl. No.: 10/283,074

(22) Filed: Oct. 30, 2002

(65) Prior Publication Data

US 2003/0081594 A1 May 1, 2003

(30) Foreign Application Priority Data

Nov. 1, 2001 (KR) .............................. 2001-67873

(51) Int. Cl.
*H04L 12/66* (2006.01)

(52) U.S. Cl. ................. 370/353; 370/354; 370/494; 370/495; 370/360

(58) Field of Classification Search ............... 370/260, 370/401, 516, 241, 218, 353, 354, 360, 495, 370/494

See application file for complete search history.

(56) References Cited

U.S. PATENT DOCUMENTS

| | | | | |
|---|---|---|---|---|
| 5,555,017 A | * | 9/1996 | Landante et al. | 348/14.09 |
| 6,011,579 A | * | 1/2000 | Newlin | 348/14.08 |
| 6,070,089 A | * | 5/2000 | Brophy et al. | 455/560 |
| 6,134,235 A | * | 10/2000 | Goldman et al. | 370/352 |
| 6,141,597 A | * | 10/2000 | Botzko et al. | 700/94 |
| 6,182,032 B1 | * | 1/2001 | Rapeli | 704/214 |
| 6,724,736 B1 | * | 4/2004 | Azriel | 370/286 |
| 6,735,195 B1 | * | 5/2004 | Mehta | 370/352 |
| 6,757,256 B1 | * | 6/2004 | Anandakumar et al. | 370/252 |
| 6,956,828 B2 | * | 10/2005 | Simard et al. | 370/260 |
| 7,006,616 B1 | * | 2/2006 | Christoffersonl et al. | 379/202.01 |
| 7,054,820 B2 | * | 5/2006 | Potekhin et al. | 704/275 |
| 7,330,900 B2 | * | 2/2008 | Burger et al. | 709/231 |
| 2002/0085697 A1 | * | 7/2002 | Simard et al. | 379/202.01 |
| 2002/0147814 A1 | * | 10/2002 | Kimchi et al. | 709/226 |

\* cited by examiner

*Primary Examiner*—Ricky Ngo
*Assistant Examiner*—Dewanda Samuel
(74) *Attorney, Agent, or Firm*—KED & Associates, LLP

(57) ABSTRACT

The present invention relates to an IP based or network based audio packet switching system, and more specifically to an audio packet switching system for integrating each independent module into a single interface for consistent control and data flow. Independent modules, such as a RTP/RTCP, encoder/decoder and mixer, are interworked with reception and transmission buffers to make a system more flexible. Additionally, audio data paths inside the switch are controlled through an audio packet router. The multi protocol system employing the RTP provides a single RTP control interface for transmitting and receiving audio packets to completely manage the system totally and raises a degree of resource utilization of the system by making it easy to implement additional functions to the RTP and coder through the buffers.

16 Claims, 5 Drawing Sheets

AUDIO PACKET SWITCHING SYSTEM

BACKGROUND OF THE INVENTION

1. Field of the Invention

The present invention relates to a network based switching system, and more particularly to an audio packet switching system, operated as a single interface when various signaling protocols are introduced, for processing Real-time Transport Protocol (RTP) packet and audio data

2. Background of the Related Art

Real-time Transport Protocol (RTP) is a communication protocol of the transport layer for transmitting and receiving voice or motion pictures in real time. RTP is characterized in that communications are processed between terminals without depending on communication devices such as a router, etc.

Generally, a system for transmitting audio data, such as IP based or network based switching system using the RTP protocol, employs a hard coding method according to a signaling protocol. Hard coding is a method that performs coding depending on the corresponding protocol.

FIG. 1 is a block diagram illustrating a configuration of a related art IP based audio packet switching system.

Referring to FIG. 1, in the related art IP based audio packet switching system, each part includes a signaling protocol 10 for signaling the other part, a Real Time Control Protocol (RTP/RTCP) module 20 for performing the RTP operation between end-points according to the signaling of each of the signaling protocols 10, and an audio coder 30 for compressing and recovering the audio packets.

The switching system, configured as described above, negotiates various pieces of information such as a signal type, an audio coding type, and transmitting point/receiving point, etc., and then operates to open and close a voice path according to a predetermined signal.

The RTP/RTCPs 20 play only a role of transmitting and receiving the audio packets through the voice path, which is connected according to the signaling. The RTP/RTCPs 20 are intended to compress and recover the transmitted and received audio packets using a Digital Signal Processor (DSP).

The functional elements of the related art audio packet switching system are accomplished by the signaling. The RTP operations are limited to the operation of the RTP at both communication end points to transmit and receive the audio/video packets.

The related art switching system and method, however, has various problems. For example, it is difficult to implement a system using various protocols and to manage overall network resources and source codes, because a hard coding method to the corresponding signaling protocol is used. The hard coding effectively prevents other protocols from being used.

If a protocol, such as a standard protocol, H.323, Session Initiation Protocol (SIP), or Media Gateway Control Protocol (MGCP), is used as the signaling protocol, the functional elements of the switching system can be implemented by simple make-ups without causing any problem in signaling, since messages and commands defined at the standard protocol are formed to give the first consideration to signaling.

Since the operations of each protocol are accomplished through a predetermined interface with the RTP in the switching system implemented using the standard protocol, however, overall RTP management with the other protocols becomes difficult. Additionally, operations of the audio coder also become difficult and implementation efficiency of additional functions is reduced.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an audio packet switching system for providing a single RTP control interface to manage overall system.

It is another object of the present invention to more efficiently use system resources by making it easy to implement additional functions to the RTP and coder through a buffer.

In order to achieve at least the above objects, in whole or in parts, there is provided a method for providing an audio packet switching system including a real time protocol unit including interface functions for performing real time protocol process and control once or more; a plurality of buffers for correcting transmission speed of audio data transmitted and received irregularly from the real time protocol unit and processing lost data during transmission once or more; an audio coder unit for compressing and recovering the audio data transmitted and received from the buffer once or more, and performing data mixing between channels according to a user selection; and an audio packet router for transmitting audio packets received from the audio coder unit and controlling flows once or more.

The audio packet switching system of the preferred embodiment preferably provides a single RTP control interface for transmitting and receiving audio packets to manage overall system and raises a degree of resource utilization of the system by making it easy to implement additional functions to the RTP and coder through a buffer.

Additionally, the preferred embodiment enables an additional function that an audio mixer interfaces with a reception buffer without regard to the RTP to carry the mixed data to a reception buffer in order to be mixed with the other channel audio data. That function can be implemented by changing a binding of the transmission and reception buffers to change an audio packet router without any changes to the RTP setting.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description describes an audio packet switching system according to a preferred embodiment of the invention in reference to the accompanying drawings.

Figure 1:
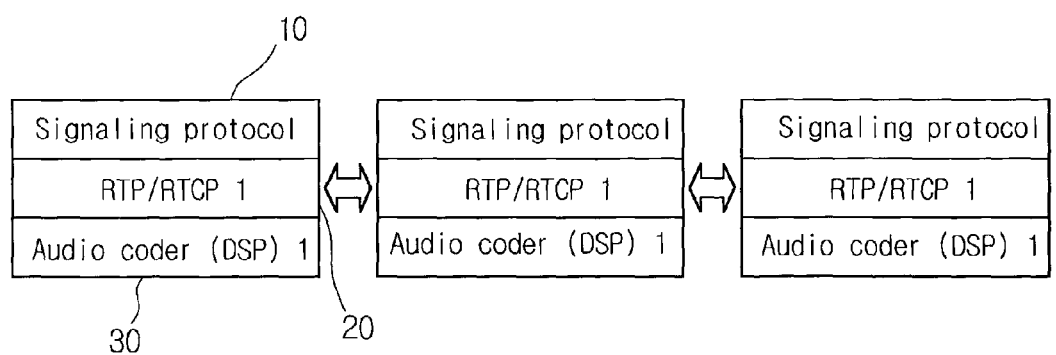
FIG. 1 is a block diagram illustrating a configuration of a related art audio packet switching system.
Figure 2:
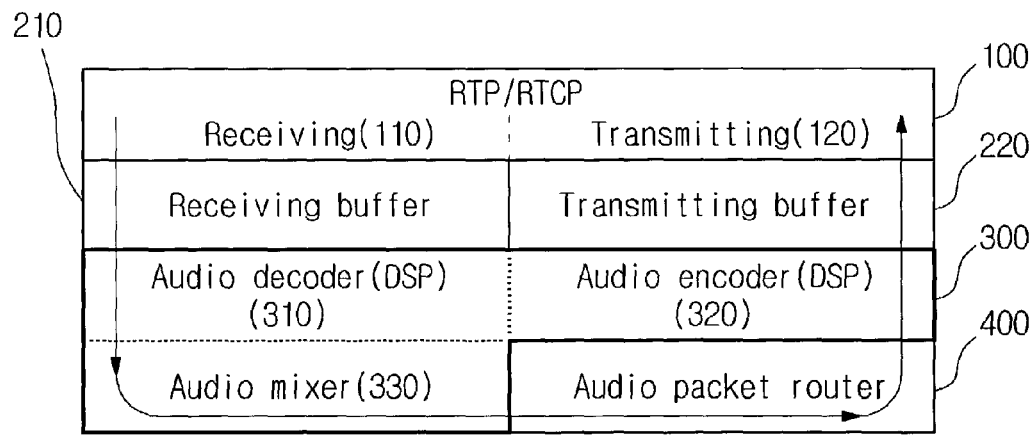
FIG. 2 illustrates a configuration of audio packet switching system according to a preferred embodiment of the present invention.

FIG. 2 is a block diagram illustrating an IP based audio packet switching system according to the preferred embodiment of the present invention. Although described herein with reference to audio packets, it should be understood that any type of packets, such as video packets, could be used.

Referring to FIG. 2, the IP based audio packet switching system preferably includes a real time protocol unit 100 (RTP/RTCP module) including interface functions for performing RTP/RTCP and controls, and buffers 210/220 for correcting a transmission speed of audio data, which is transmitted and received irregularly from the real time protocol unit 100. The IP based audio packet switching system preferably further includes an audio coder unit 300 for compressing and recovering the audio data transmitted and received from the buffers 210/220, and for mixing data between channels according to a user's selection. An audio packet router 400 is also provided for transmitting audio packets received from the audio coder unit 300 to a destination point or adjusting data flows.

Although the RTP/RTCP module 100 is preferably provided as one block, the module 100 conceptually operates separately as a transmitting unit 110 and a receiving unit 120. The transmitting unit 110 and receiving unit 120 perform their own protocol functions, such as packetizing the transmitted and received audio data.

The buffers 210/220 preferably include a transmission buffer 210 for storing the irregularly received audio packets from the RTP/RTCP module 100 and a reception buffer 220 for storing the audio packets to be transmitted via the RTP/RTCP module 100. Additionally, the audio coder unit 300 includes an audio decoder 310 and an audio encoder 320. These are preferably DSPs.

The transmission and reception buffers 210/220 interwork with each other to correct irregular transmission speeds of the audio data transmitted and received through networks, and to perform procedures when the audio data is not transferred completely via the networks.

The procedures performed when the audio data is not transferred completely through the networks includes inserting data at a position corresponding to lost audio data during the transmission and reception process. This is known as packet loss concealment.

The audio coders 300 preferably include a decoder 310 for transforming the audio data, which has been transmitted compressed in a predetermined scheme, into PCM data, and an encoder 320 for compressing PCM data to be transmitted in the predetermined scheme. It additionally includes a mixer 330 for mixing the PCM data with another channel PCM data according to a user's selection.

As shown in FIG. 2, since the audio packet switching system according to the preferred embodiment is configured and controlled as a single system, the RTP 100 and coder 300 can be employed for other uses and/or protocols because the RTP and coder input and output the audio data to each corresponding buffer. That is, the encoder inputs data to the transmitting buffer and the decoder receives data from the receiving buffer.

Thus, FIG. 2 shows that RTP management according to every protocol can be implemented as a single apparatus.

Figure 3:
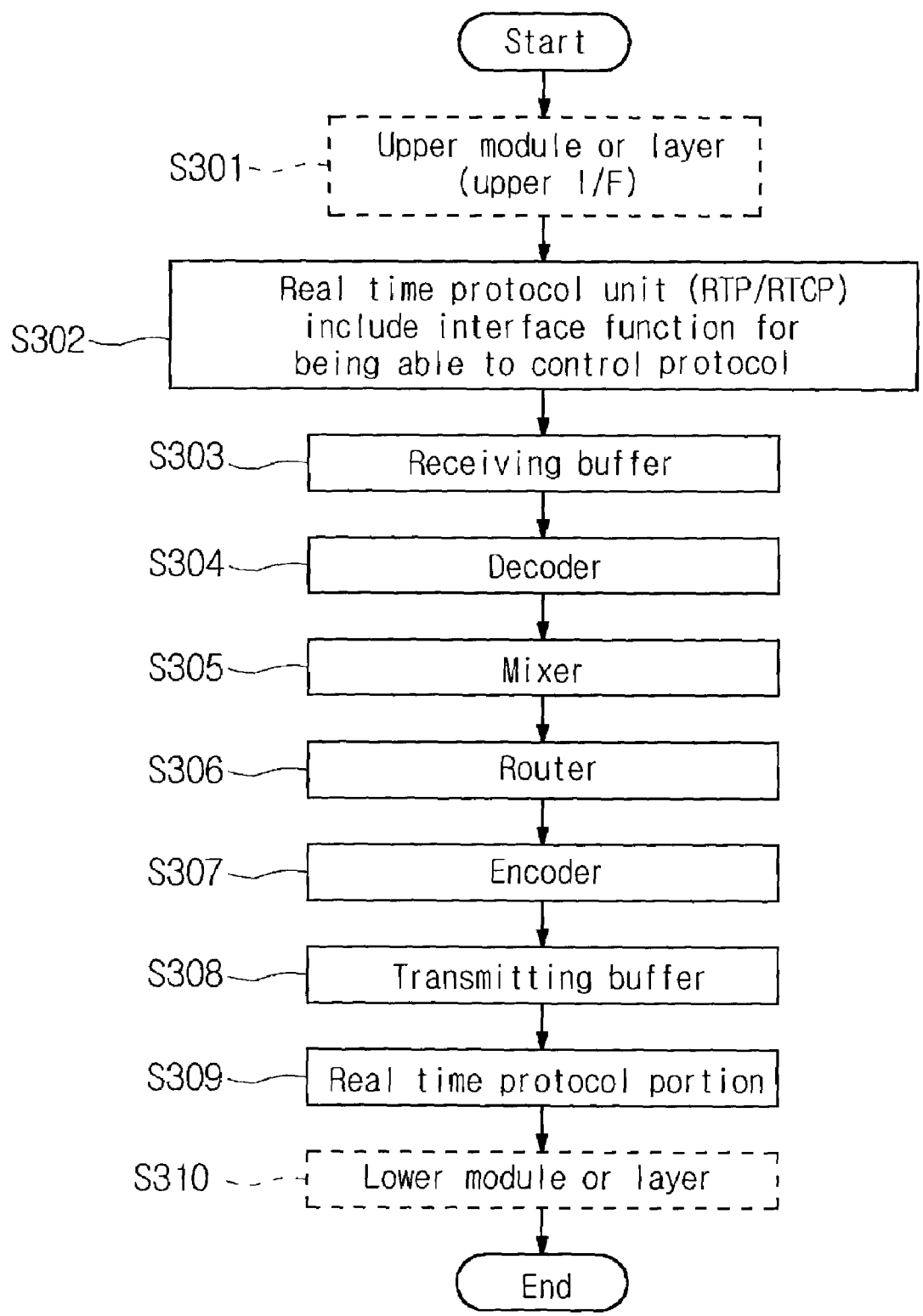
FIG. 3 is a flow chart illustrating an operating procedure between elements of the audio packet switching system of FIG. 2.

FIG. 3 is a flow chart of an operating procedure between elements of the audio packet switching system of FIG. 2

Referring to FIG. 3, at least one audio data and interface/control information is transmitted from an upper module or layer of the audio packet switching system to the real time protocol unit 100 (steps S301, S302).

The real time protocol unit 100, including interface functions for controlling each different protocol, transforms the received data into data to be operated in the audio packet switching system and transmits the transformed data to the reception buffer 210 (step S303).

The data stored in the reception buffer 210 is next transmitted to the audio decoder 310 (step S304). The audio decoder 310 preferably includes software for interpreting data according to each protocol to be operated accordingly. Thus, the audio decoder can decode data regardless of the protocol.

The data input to the audio decoder 310 is next transmitted to the mixer 330, if mixing is needed for the data (step S305).

The audio data in the reception buffer 210 is next provided to the router 400 when it is to be transmitted to a set address or while deciding to which address it is to be transmitted (step S306).

The data input to the router 400 is next compressed in the encoder 320 and provided to the transmission buffer 220 (steps S307, S308). From the transmission buffer 400, the data is transmitted to a lower module or layer through the transmitting unit 120 of the real time protocol unit 100 (steps S309, 310).

Figure 4:
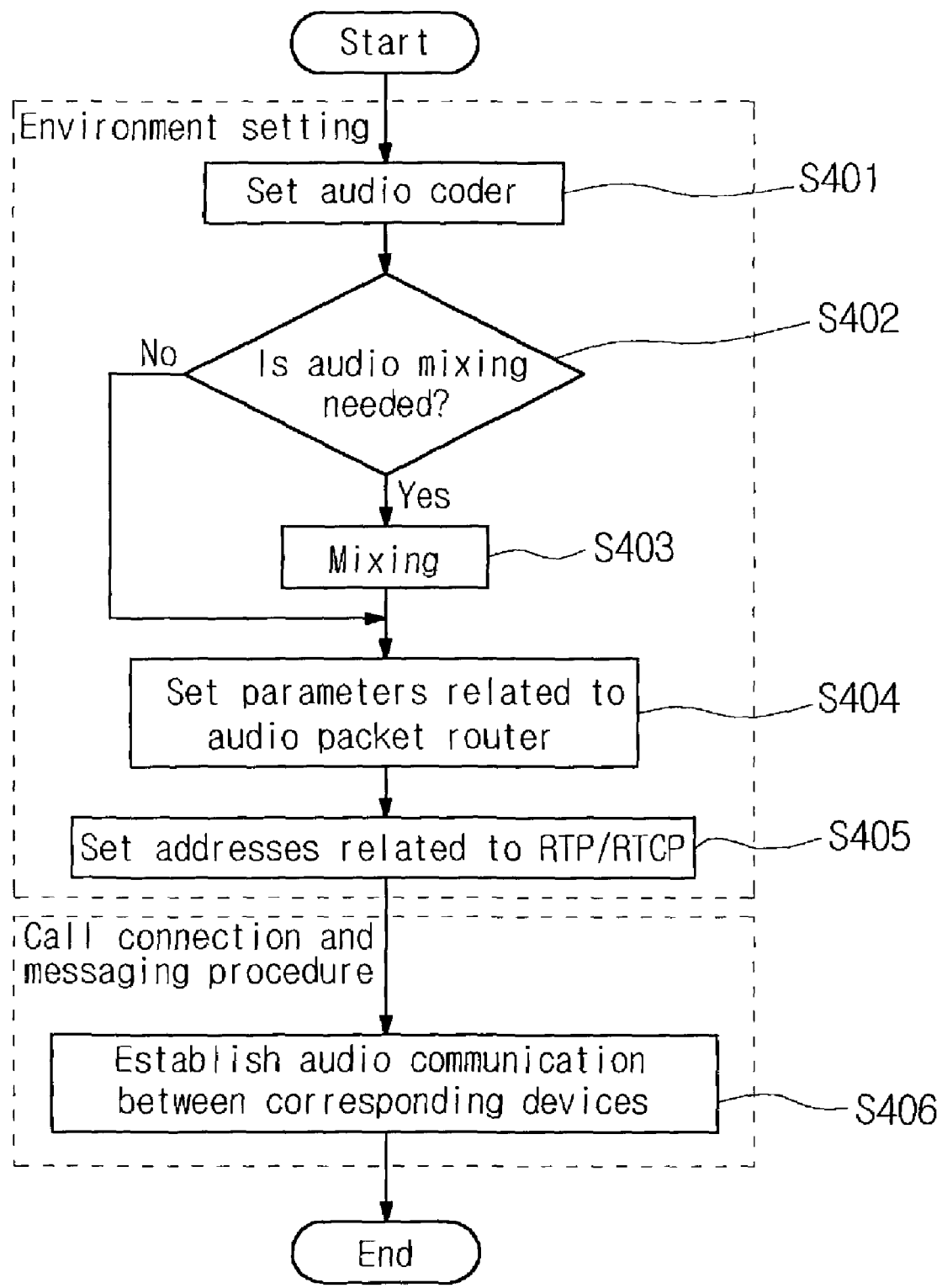
FIG. 4 is a flow chart illustrating an operating procedure for an IP based audio packet switching method according to the preferred embodiment of the present invention.

In order to transmit the received audio data to the destination point in the switching system configured as shown in FIG. 2, the audio switching system preferably includes a setting as shown in FIG. 4.

FIG. 4 is a flow chart illustrating an operating procedure for the IP based audio packet switching method according to the preferred embodiment of the present invention.

Referring to FIG. 4, in order to operate the audio switching system in each different protocol, the method preferably comprises an environment setting step for setting the audio coder, router parameters, mixing, and protocol addresses, as well as a step for connecting calls and messages between corresponding devices.

Thus, referring to FIG. 4, the audio coder is first set (S401). In setting the audio coder, methods for compressing and recovering transmitted and received PCM data are first set, and DSP core or parameters for encoder 320 and decoder 310 are next set. Then it is determined whether audio mixing is necessary (S402). If it is necessary, the mixing is performed (S403). Otherwise, the mixing is bypassed.

After setting the audio coder, parameters related to the audio packet router are next set (step S404). The setting of the parameters related to the audio packet router are set according to which address the audio data in the transmission buffer is transmitted. When the audio packets are stored in the transmission buffer after setting their destination point, the transmitting unit 120 of the RTP/RTCP module 100 transmits them.

To change the destination point at the audio packet router 400 means that a system manager can change the destination point of the audio packets. Accordingly, the audio packet destination point can be changed by a third control signal according to a manager's request.

Addresses related to RTP/RTCP are thus set (step S405), which is an address setting necessary for RTP operations for audio communication between devices.

After all of the above described settings are set, the audio communication is established (step S406).

To change or delete the settings, a reverse procedure to the setting procedure is preferably performed.

The above-described operations of the audio packet switching system will next be described in additional detail with reference to FIG. 5, which shows a procedure that includes interfacing with an upper system.

In the following description, the audio packets received from the receiving unit 110 of the RTP/RTCP module 100 are stored in the reception buffer 210. The decoder 310 of the audio coder unit 300 then transforms the audio packets in the reception buffer 210 into the PCM data.

If the transformed PCM data is set to be mixed with the PCM data of a second channel by a user in time of first system setting, the mixer 330 mixes the transformed PCM data with the second channel PCM data. The encoder 320 then compresses the mixed PCM data in a user designated scheme and stores the compressed results in the transmission buffer 220 in order to transmit them to the destination point. The destination point is preferably set in the audio packet router 400. Then, the compressed results are transmitted from the transmitting unit 120 of the RTP/RTCP module 100 to the destination point.

This process will be described in more detail with reference to FIG. 5.

According to the audio packet switching system of the preferred embodiment, paths are set or changed by switching the audio data inside the audio packet router without changing every parameter setting, including the RTP, or completely managing every module and procedure related to transmission and reception of the audio packets.

The procedure begins with setting parameters of each module described in FIG. 2 and operating the corresponding modules.

Figure 5:
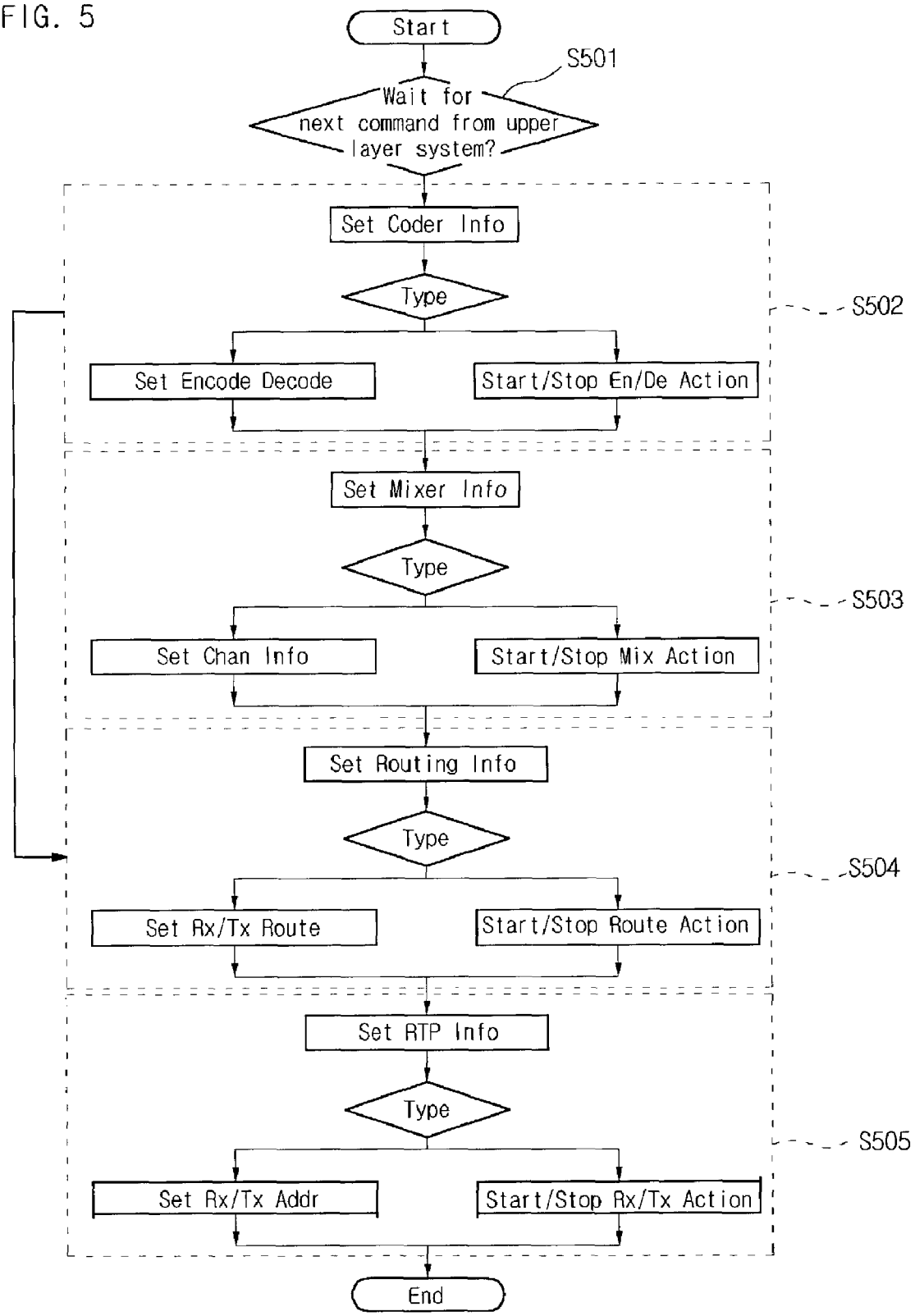
FIG. 5 is a flow chart illustrating an operating procedure of an interface of an upper layer system.

As shown in FIG. 5, the audio coder is set when the following commands are input from the upper system (S501) and a start or stop operation of the encoder and decoder in the thusly set audio coder is performed (step S502). This is done to set the methods for compressing and recovering the PCM data to be used in transmission and reception, which are setting and operating procedures for DSP core or parameters of the encoder/decoder modules. In step S501, the "wait for next command" instructs the system to wait for a control message from a system, which controls the audio packet switch or a control module of the system. The control message can be defined differently at each system.

If audio mixing is needed, as in a case of conference, etc., the channel from which the audio data is to be mixed is set, and then a start or stop operation of the mixer is performed (step S503).

The above operations are preferably performed in the corresponding DSP core and encoder/decoder modules.

After the settings relating to the audio coder are completed, parameters relating to the audio packet router are set (step S504).

This is done to establish to which transmission buffer received audio data is to be carried, and to perform a start or stop operation of routing. This enables audio data routing besides general packet routing inside the switch.

By changing the setting, the binding can be changed by a third control signal output from a controller in the system, etc., according to protocols of the received and transmitted audio data.

Finally, when operating the RTP after setting the RTP/RTCP related addresses, the data in the reception buffer is transmitted to a transmission buffer corresponding to the set address. The audio communication is then established between the corresponding devices (step S505).

In order to clear the operations of FIG. 5, it is sufficient to clear each step one by one in the reverse procedure to the setting procedure.

Figure 6:
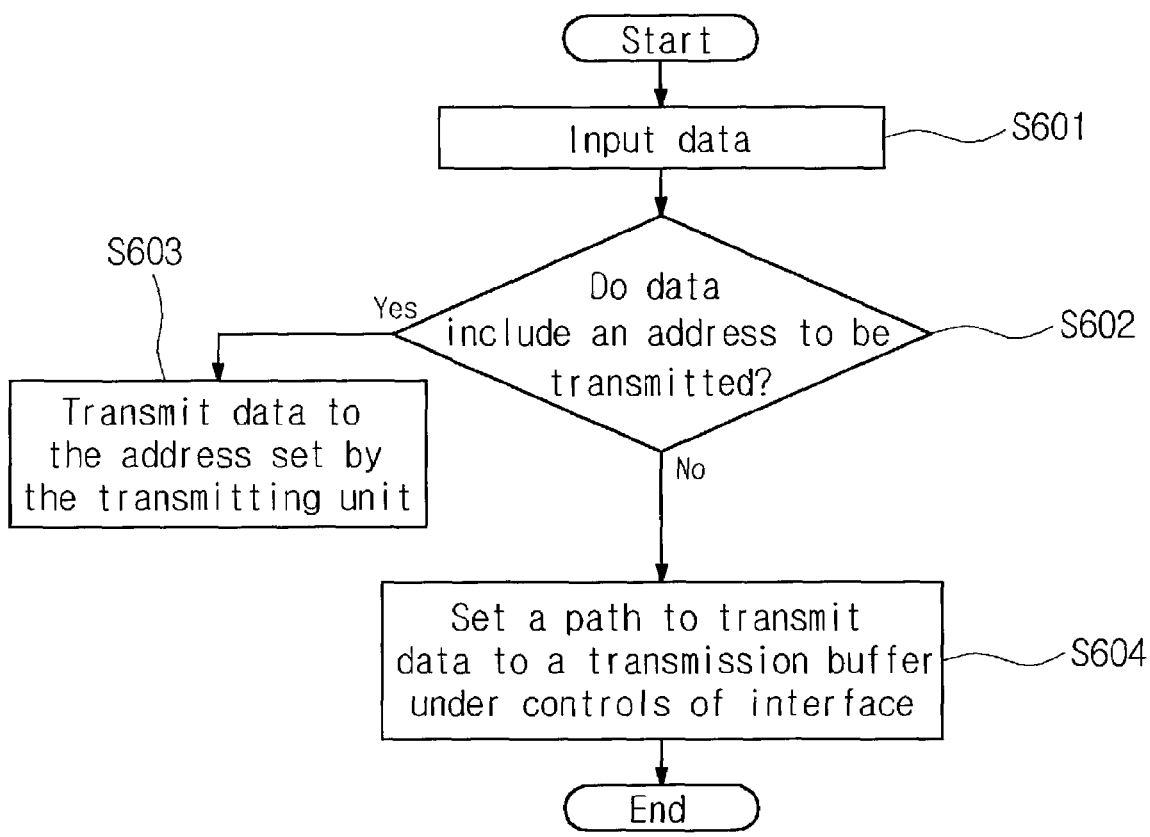
FIG. 6 is a flow chart illustrating operations of an audio packet router.

Referring to FIG. 6, another embodiment of the present invention is configured and operated as a single system, with only a mixing or routing operation performed, and without operating the encoder and decoder of FIG. 2. This is because encoding and decoding are not necessary when using the same coder in the transmitting and receiving unit.

In the operation of the audio packet router of this embodiment, data is first received from the decoder or mixer of FIG. 2 (step S601). Next, it is determined whether the received data includes transmission addresses (step S602). If so, a general routing operation for transmitting the data to the prescribed address is performed (step S603). Otherwise, if the received data does not include the address, a transmission path of the data is set by the controller to transmit the data to the transmitting unit (step S604).

According to this configuration, the audio mixer interfaces with the reception buffer without regard to the RTP. Accordingly, the mixed audio data can be carried to the reception buffer again to be mixed with the audio data of another channel.

In appending, the number of mixable signals at a time is typically fixed. Accordingly, signals are divided and mixed when more signals than the fixed number of signals are to be mixed.

Specifically, first mixed signals are stored in a buffer, second mixing is performed, and then mixing of the first mixed signals with the second mixed signals is performed again.

The audio packet system as described herein has many advantages. For example, when employing the DSP, which enables the audio mixing between two channels, it is easy to further mix the audio data. Additionally, a unicast paging function can be easily implemented by carrying the audio data from a single reception buffer to the multiple transmission buffers, since they are configured to a single system.

It is also possible to change the binding between the reception and transmission buffers through the audio packet router without changing any settings of the RTP, etc. Accordingly, intermittence of an audio stream, which may be generated when performing the same functions through resetting the RTP, etc., can be prevented. When the audio data transmitted through the RTP is switched frequently among various channels, it can be efficiently used.

The preferred embodiment transforms the received audio packets to the PCM data, compresses the transformed data in a user-designated scheme to transmit the same, or compresses the audio packets after mixing them with another channel PCM data, and transmits the same. Therefore, functions for transmitting, receiving, and controlling the audio packets can be performed relatively fast and freely and can be controlled by way of a single apparatus.

Moreover, it is possible to integrate each independent module of FIG. 2 into a single interface for consistent control and data flow, interwork the independent modules such as the RTP/RTCP, encoder/decoder, and mixer with the reception and transmission buffers. This increases a flexibility of the related art structure, and provides additional strong functions to the RTP and audio processing module, which performs only limited functions according to the related art standard protocol, by controlling the audio data paths inside the switch through the audio packet router.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An audio packet switching system, comprising:
    a real time protocol unit including interface functions to perform real time protocol processing and controlling;
    a plurality of buffers coupled to correct a transmission speed of audio data transmitted and received irregularly to and from the real time protocol unit, and to correct for data lost during transmission;
    an audio coder unit coupled to compress and recover the audio data transmitted and received from the plurality of buffers and to perform data mixing between channels according to a user selection; and
    an audio packet router coupled to transmit audio packets received from the audio coder unit and to control data flow, wherein the real time protocol unit, the plurality of buffers, the audio coder unit, and the audio packet router are provided in a single integrated system, wherein the audio coder unit comprises:
        a decoder to transform audio data received as compressed data in a prescribed scheme according to a protocol of the data into pulse code modulation (PCM) data,
        an encoder to compress the PCM data to be transmitted in the prescribed scheme according to a prescribed protocol, and
        a mixer to mix the transformed PGM data at the decoder with PCM data of another channel according to a user's selection, wherein the mixer interfaces with a reception buffer of the plurality of mixers without regard to the real time protocol unit and carries the mixed data to the reception buffer to mix with audio data of the other channel.

2. The system of claim 1, wherein the plurality of buffers comprises:
    a reception buffer to store audio packets received irregularly from the real time protocol unit; and
    a transmission buffer to store the audio packets to be transmitted through the real time protocol unit.

3. The system of claim 2, wherein the transmission buffer and the reception buffer are configured to correct an irregular transmission speed of the transmitted and received audio data and to process the audio data at least once when the audio data is not transferred completely, and wherein the audio data is transmitted and received through at least one network.

4. The system of claim 3, wherein to process the audio data when the audio data is not transferred completely comprises inserting data at a position corresponding to lost audio data during a transmission or reception process.

5. The system of claim 4, wherein to process the audio data comprises to perform a packet loss concealment.

6. The system of claim 4, wherein the audio data is transmitted and received independently of a signaling protocol of the at least one network.

7. An audio packet switching system, comprising:
    a real time protocol unit including interface function to real time protocol processing and controlling;
    a plurality of buffers coupled to correct a transmission speed of audio data transmitted and received irregularly to and from the real time protocol unit, and to correct for data lost during transmission;
    an audio coder unit coupled to compress and recover the audio data transmitted and received from the plurality of buffers and to perform data mixing between channels according to a user selection; and
    an audio packet router coupled to transmit audio packets received from the audio coder unit and to control data flow, wherein the real time protocol unit, the plurality of buffers, the audio coder unit, and the audio packet router are provided in a single integrated system, wherein the plurality of buffers comprises:
        a reception buffer to store audio packets received irregularly from the real time protocol unit, and
        a transmission buffer to store the audio packets to be transmitted through the real time protocol unit, wherein the real time protocol unit and the audio coder unit input and output the audio data to corresponding buffers of the plurality of buffers.

8. The system of claim 7, wherein the real time protocol unit and audio coder unit are employed for other uses because the audio data is input and output to the corresponding buffers.

9. The system of claim 7, wherein the audio coder unit comprises:
    a decoder to transform audio data received as compressed data in a prescribed scheme according to a protocol of the data into pulse code modulation (PCM) data; and
    an encoder to compress the PCM data to be transmitted in the prescribed scheme according to a prescribed protocol.

10. The system of claim 9, wherein the audio coder unit further comprises a mixer to mix the transformed PCM data at the decoder with PCM data of another channel according to a user's selection.

11. An audio packet switching system, comprising:
    a real time protocol unit including interface functions to perform real time protocol processing and controlling;
    a plurality of buffers coupled to correct a transmission speed of audio data transmitted and received irregularly to and from the real time protocol unit, and to correct for data lost during transmission;
    an audio coder unit coupled to compress and recover the audio data transmitted and received from the plurality of buffers and to perform data mixing between channels according to a user selection; and
    an audio packet router coupled to transmit audio packets received from the audio coder unit and to control data flow, wherein the real time protocol unit, the plurality of buffers, the audio coder unit, and the audio packet router are provided in a single integrated system, wherein the audio coder unit comprises:
        a decoder to transform audio data received as compressed data in a prescribed scheme according to a protocol of the data into pulse code modulation (PCM) data, and
        an encoder to compress the PCM data to be transmitted in the prescribed scheme according to a prescribed protocol, wherein only the mixing or routing operation is performed without operating the encoder and the decoder when a transmitting unit and a receiving unit use a same coder.

12. An audio packet switching system, comprising:
a real time protocol unit including interface functions to perform real time protocol processing and controlling;
a plurality of buffers coupled to correct a transmission speed of audio data transmitted and received irregularly to and from the real time protocol unit, and to correct for data lost during transmission;
an audio coder unit coupled to compress and recover the audio data transmitted and received from the plurality of buffers and to perform data mixing between channels according to a user selection; and
an audio packet router coupled to transmit audio packets received from the audio coder unit and to control data flow, wherein the real time protocol unit, the plurality of buffers, the audio coder unit, and the audio packet router are provided in a single integrated system, and wherein audio data flow can be controlled inside an audio packet switch by using the audio packet router.

13. An integrated audio packet switching system comprising:
a real time protocol unit, provided in an integrated system, to perform real time protocol processing;
a plurality of buffers, provided in the integrated system, to adjust a transmission speed of audio data transmitted and received from the real time protocol unit, and to correct for lost data, wherein the plurality of buffers include:
a reception buffer, coupled to the real time protocol unit, to store audio data received from the real time protocol unit, and
a transmission buffer, coupled to the real time protocol unit, to store audio data to be transmitted by the real time protocol unit;
an audio coder unit, provided in the integrated system and coupled to the plurality of buffers, to compress and recover the audio data from the plurality of buffers and to perform data mixing between channels; and
an audio packet router, provided in the integrated system and coupled to the audio coder unit, to transmit audio packets received from the audio coder unit and to control data flow, wherein the transmission buffer and the reception buffer to correct irregular transmission speed of transmitted audio data or received audio data and to process the audio data at least once when the audio data is not transferred completely by inserting data at a position corresponding to lost audio data during a transmission or reception process.

14. The integrated audio packet switching system of claim 13, wherein the real time protocol unit and the audio coder unit input and output the audio data to corresponding buffers of the plurality of buffers.

15. The integrated audio packet switching system of claim 13, wherein the audio coder unit comprises:
a decoder to transform received audio data into pulse code modulation (PCM) data; and
an encoder to compress the PGM data to be transmitted in a prescribed scheme according to a prescribed protocol.

16. The integrated audio packet switching system of claim 15, wherein the audio coder unit further comprises a mixer to mix the transformed PCM data at the decoder with PGM data of another channel according to a user's selection.

* * * * *